United States Patent
Giladi (10) Patent No.: US 9,705,955 B2
(45) Date of Patent: Jul. 11, 2017

(54) PERIOD LABELING IN DYNAMIC ADAPTIVE STREAMING OVER HYPERTEXT TRANSFER PROTOCOL

(71) Applicant: Futurewei Technologies, Inc., Plano, TX (US)

(72) Inventor: Alexander Giladi, Princeton, NJ (US)

(73) Assignee: Futurewei Technologies, Inc., Plano, TX (US)

(*) Notice: Subject to any disclaimer, the term of this patent is extended or adjusted under 35 U.S.C. 154(b) by 533 days.

(21) Appl. No.: 14/256,422

(22) Filed: Apr. 18, 2014

(65) Prior Publication Data

US 2014/0317307 A1    Oct. 23, 2014

Related U.S. Application Data

(60) Provisional application No. 61/813,559, filed on Apr. 18, 2013.

(51) Int. Cl.
*G06F 15/16* (2006.01)
*H04L 29/06* (2006.01)

(52) U.S. Cl.
CPC .......... *H04L 65/608* (2013.01); *H04L 65/602* (2013.01); *H04L 65/80* (2013.01)

(58) Field of Classification Search
CPC ..... H04L 65/80; H04L 65/602; H04L 65/608; H04L 65/60; H04L 65/1016; H04L 47/2416; H04N 21/4305
See application file for complete search history.

(56) References Cited

U.S. PATENT DOCUMENTS

| 2011/0119395 | A1* | 5/2011 | Ha | H04L 47/2416 709/231 |
| 2014/0222962 | A1* | 8/2014 | Mao | H04N 21/4305 709/219 |

OTHER PUBLICATIONS

"Information Technology—Generic Coding of Moving Pictures and Associated Audio Information: Systems," International Standard, ISO/IEC 13818-1, Second Edition, Dec. 1, 2000, 174 pages.
"Information technology—Dynamic adaptive streaming over HTTP (DASH)—Part 1: Media presentation description and segment formats," International Standard, ISO/IEC FDIS 23009-1:2013(E), ISO/IEC JTC 1/SC 29/WG 11, Aug. 2, 2013, 150 pgs.

\* cited by examiner

*Primary Examiner* — Yves Dalencourt
(74) *Attorney, Agent, or Firm* — Conley Rose, P.C.

(57) ABSTRACT

A method of Dynamic Adaptive Streaming over Hypertext Transfer Protocol (HTTP) (DASH) comprising receiving an asset that comprises a media presentation described in a media presentation description (MPD), wherein the media presentation comprises one or more periods, and wherein each period comprises at least one adaptation set, and identifying the asset on a period level using one or more asset identifiers specified in the MPD.

21 Claims, 5 Drawing Sheets

```
<!-- Period -->
 <xs:complexType name="PeriodType">
  <xs:sequence>
   <xs:element name="BaseURL" type="BaseURLType" minOccurs="0" maxOccurs="unbounded"/>
   <xs:element name="SegmentBase" type="SegmentBaseType" minOccurs="0"/>
   <xs:element name="SegmentList" type="SegmentListType" minOccurs="0"/>
   <xs:element name="SegmentTemplate" type="SegmentTemplateType" minOccurs="0"/>
   <xs:element name="AssetIdentifier" type="DescriptorType" minOccurs="0"/>
   <xs:element name="EventStream" type="EventStreamType" minOccurs="0" maxOccurs="unbounded"/>
   <xs:element name="AdaptationSet" type="AdaptationSetType" minOccurs="0" maxOccurs="unbounded"/>
   <xs:element name="Subset" type="SubsetType" minOccurs="0" maxOccurs="unbounded"/>
   <xs:any namespace="##other" processContents="lax" minOccurs="0" maxOccurs="unbounded"/>
  </xs:sequence>
  <xs:attribute ref="xlink:href"/>
  <xs:attribute ref="xlink:actuate" default="onRequest"/>
  <xs:attribute name="id" type="xs:string" />
  <xs:attribute name="start" type="xs:duration"/>
  <xs:attribute name="duration" type="xs:duration"/>
  <xs:attribute name="bitstreamSwitching" type="xs:boolean" default="false"/>
  <xs:anyAttribute namespace="##other" processContents="lax"/>
 </xs:complexType>
```

PERIOD LABELING IN DYNAMIC ADAPTIVE STREAMING OVER HYPERTEXT TRANSFER PROTOCOL

CROSS-REFERENCE TO RELATED APPLICATIONS

The present application claims benefit of U.S. Provisional Patent Application No. 61/813,559 filed Apr. 18, 2013 by Alexander Giladi and entitled "Period Labeling in Dynamic Adaptive Streaming over Hypertext Transfer Protocol," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A media content provider or distributor may deliver various media contents to users using different coding schemes suited for different devices, such as televisions, notebook computers, and mobile handsets. An asset may comprise media content and metadata expressed as a media presentation description (MPD). The MPD may be an extensible markup language (XML) file or document describing the media content, such as its various representations, uniform resource locator (URL) addresses, and other characteristics. For example, the media content may comprise several media components (e.g. audio, video, and text), each of which may have different characteristics that are specified in the MPD.

Depending on the application, an asset or media content may be divided into various hierarchies. For example, the media content may comprise multiple periods, where a period is a time interval relatively longer than a segment. For instance, a television program may be divided into several 5-minute-long program periods, which are separated by several 2-minute-long advertisement periods. Further, a period may comprise one or multiple adaptation sets (AS). An AS may provide information about one or multiple media components and its/their various encoded representations. For instance, an AS may contain different bit-rates of a video component of the media content, while another AS may contain different bit-rates of an audio component of the same media content. A representation may be an encoded alternative of a media component, varying from other representations by bit-rate, resolution, number of channels, or other characteristics, or combinations thereof. Each representation comprises multiple segments, which are media content chunks in a temporal sequence.

In adaptive streaming, when delivering a media content to a user device, the user device may select appropriate segments dynamically based on a variety of factors, such as network conditions, device capability, and user choice. Adaptive streaming may include various equivalent technologies and/or standards, such as Dynamic Adaptive Streaming over Hypertext Transfer Protocol (HTTP) (DASH), HTTP Live Streaming (HLS), or Internet Information Services (IIS) Smooth Streaming. For example, DASH defines a manifest format, MPD, and segment formats for International Organization for Standardization (ISO) Base Media File Format (ISO-BMFF) and Moving Picture Experts Group (MPEG) Transport Stream under the family of standards MPEG-2, as described in ISO/International Electrotechnical Commission (IEC) 13818-1, titled "Information Technology—Generic Coding of Moving Pictures and Associated Audio Information: Systems."

An MPD comprises various generic descriptors that describes or defines different levels of the media content. In MPD for DASH applications, generic descriptors such as supplemental property may be present on the adaptation set and representation levels, but not on the period level. Thus, when a period comprises more than one AdaptationSet, the descriptor needs to be repeated with each AdaptationSet, which may lead to inefficiency and/or inconsistency.

SUMMARY

In one embodiment, the disclosure includes a method of DASH comprising receiving an asset that comprises a media presentation described in an MPD, wherein the media presentation comprises one or more periods, and wherein each period comprises at least one adaptation set, and identifying the asset on a period level using one or more asset identifiers specified in the MPD.

In another embodiment, the disclosure includes an apparatus for DASH, the apparatus comprising a transceiver configured to transceive an MPD for an asset, wherein the asset comprises a media presentation that is described in the MPD, wherein the media presentation comprises a period that is defined by a period element in the MPD, wherein the period element comprises an asset identifier specifying that the period belongs to the asset, and a memory device coupled to the transceiver and configured to store the MPD.

In yet another embodiment, the disclosure includes a computer program product comprising computer executable instructions stored on a non-transitory computer readable medium such that when executed by a processor cause a network node to receive an MPD for a main media content, wherein the main media content comprises a plurality of periods, wherein at least some of the periods are separated by one or more inserted contents, and wherein the MPD comprises an identifier unique for each of the inserted contents, and identify an inserted content based on a corresponding identifier.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments for identifying an asset on a period level and for identifying inserted content between periods of the asset. In an embodiment, when a period comprises multiple adaptation sets, identifying the asset on the period level uses no more than one descriptor for each period that comprises multiple adaptation sets. Thus, the potential issue of repeated labeling for multiple adaptation sets is avoided. For DASH applications, an asset identifier may be used to identify the periods belonging to a main media content. Further, when a streaming client needs to report which inserted content (e.g., specific advertisement or commercial) is being played, disclosed embodiments may identify the inserted content using identifiers unique to each inserted content and then report the identity information to a streaming server side.

Figure 1:
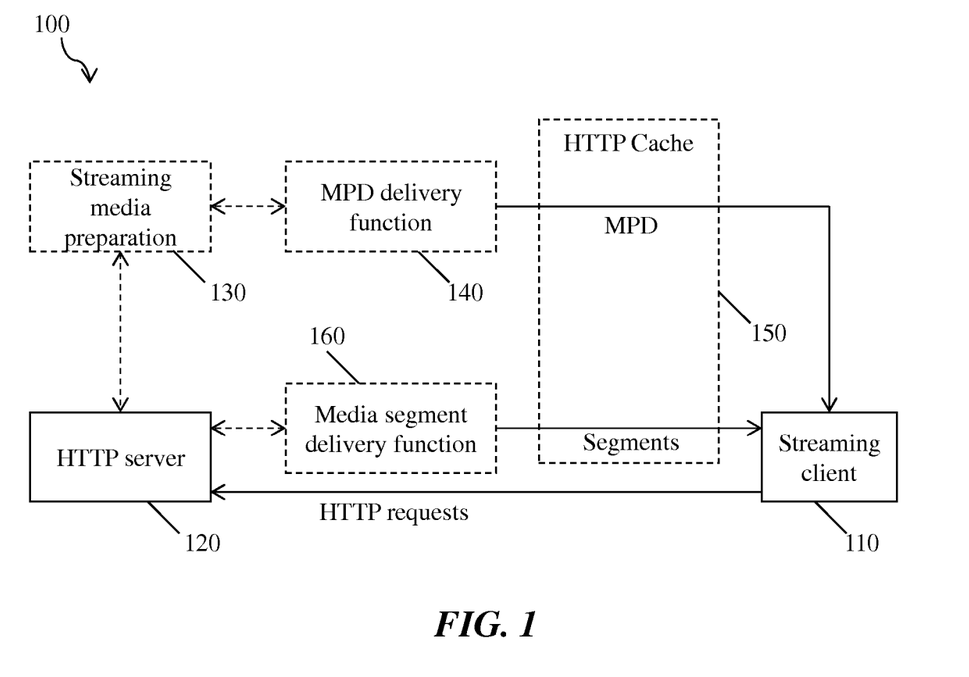
FIG. 1 is a schematic view of an embodiment of a media streaming system.

FIG. 1 illustrates an embodiment of a media streaming system 100, which may be implemented to deliver media contents from an HTTP server 120 to a streaming client 110. For example, the streaming system 100 may be a DASH system, in which case the streaming client 110 is a DASH client. The streaming system 100 may also be another type of streaming system. The streaming client 110 may be a program or application implemented in an operating system of a user device, or it may be a web client accessed in a web platform. A media content, sometimes referred to as an asset, stored in the HTTP server 120 may be generated or prepared by a streaming media preparation unit 130. The media preparation unit 130 may be located in the HTTP server 120 or elsewhere (e.g., in a content provider). The HTTP server 120 may be part of a content provider or may be a node in a content distribution network (CDN). The media content may be generated by the content provider and then transmitted to a CDN node. The media content in the HTTP server 120 may comprise an MPD and a plurality of segments. If desired, the MPD and the segments may be stored in different servers and sent to the streaming client 110 from different servers. In addition, the HTTP server 120 described herein merely serves as an example of a server, it should be understood that embodiments disclosed herein may also be implemented in any other suitable type of server.

In the streaming system 100, the streaming client 110 may send a request to the HTTP server 120 for media content. In response, the HTTP server 120 may first use an MPD delivery function 140 to deliver an MPD to the streaming client 110. The MPD can be delivered using HTTP, email, thumb drive, broadcast, or any other transport. By parsing the MPD, the streaming client 110 may learn information regarding the media content, such as the timing of the program, the availability of media content, the media types, resolutions, minimum and maximum bandwidths, the existence of various encoded alternatives of multimedia components, the accessibility features and the required digital right management (DRM), the location of each media component on the network, and other characteristic of the media content. Using this information, the streaming client 110 may select the appropriate encoded representation or alternative and start streaming of the media content by fetching segments using HTTP GET requests.

The HTTP server 120 may further use a media segment delivery function 160 to deliver the segments to the streaming client 110. The streaming client 110 may download segments from a plurality of HTTP servers, e.g., to maximize usage of network bandwidth. The streaming client 110 may render the downloaded media appropriately so as to provide streaming service to a user of the streaming client 110. Although the streaming client 110 may obtain the segments based on locations specified by URLs contained in the MPD, sometimes the MPD and/or the segments may be stored in an HTTP cache 150 so that the streaming client 110 may receive them more efficiently. The HTTP cache 150 may reside in the HTTP server 120, the streaming client 110, or a CDN node.

In DASH services, after appropriate buffering to allow for network throughput variations, the streaming client 110 may continue to download subsequent segments while monitoring bandwidth fluctuations of the network. Depending on its measurements, the streaming client 110 may adaptively adjust streaming to the available bandwidth by downloading segments of different representations (e.g., with a lower or higher bit-rate) to maintain an adequate buffer.

Figure 2:
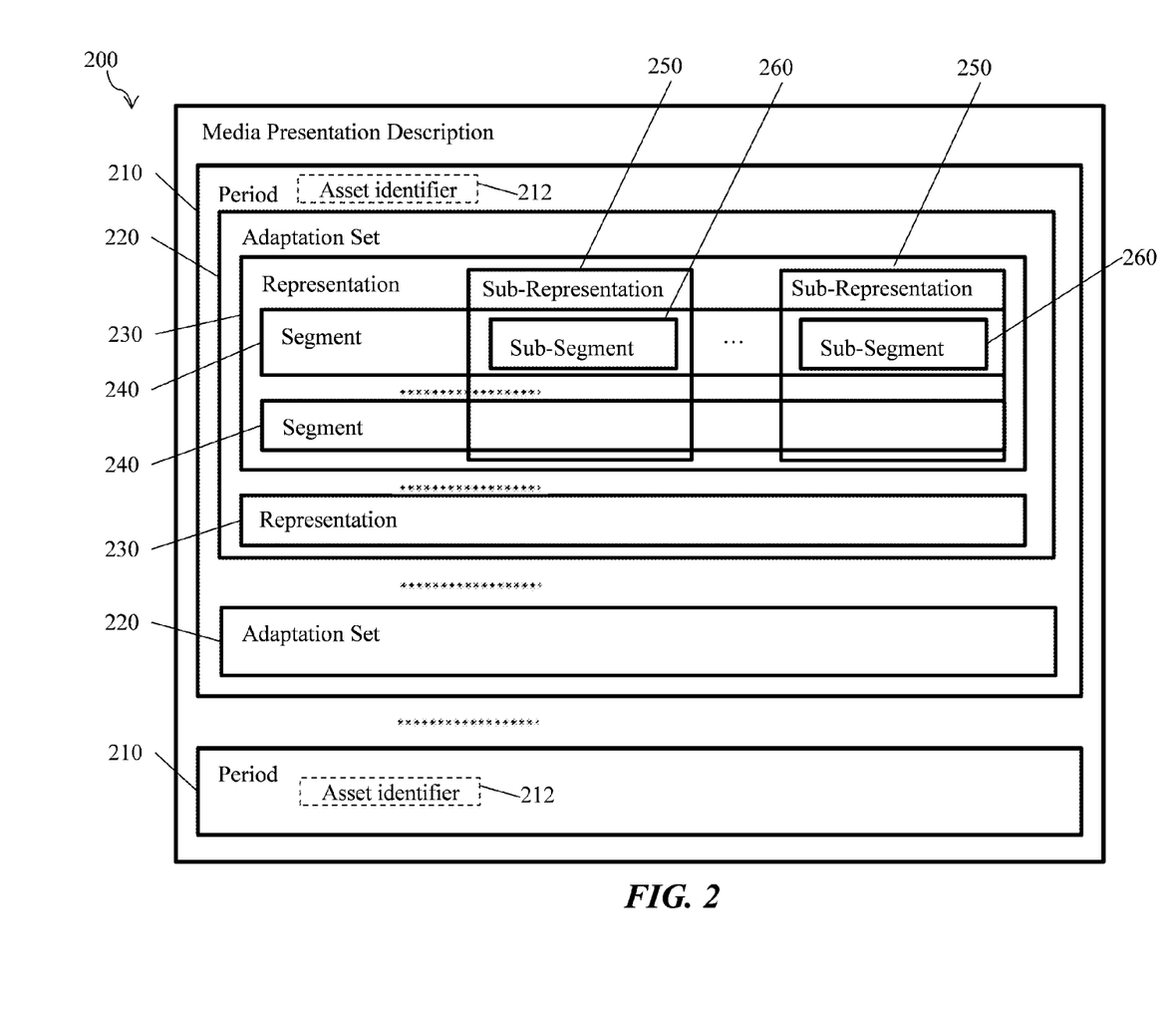
FIG. 2 is a schematic diagram of an embodiment of an MPD.

FIG. 2 is a schematic diagram of an embodiment of an MPD 200 used in media streaming. In an embodiment, an HTTP server (e.g., HTTP server 120 as shown in FIG. 1) may generate the MPD 200, which is a hierarchical data model. The MPD 200 may be implemented as one or more documents containing functional metadata that describes a media presentation, sometimes referred to as media content. In accordance with ISO/IEC 23009-1, the MPD 200 may be referred to as a formalized description for a media presentation for the purpose of providing a streaming service. In one embodiment, the MPD 200 may be an XML document. Although the MPD 200 provides metadata necessary to access and present the content, the MPD 200 may not describe the content itself.

A media presentation, in turn, may be referred to as a collection of data that establishes a presentation of media content. For example, the MPD 200 may comprise elements that describe media content in terms of periods, adaptation sets, segments, representations, and other information. In particular, the MPD 200 may define formats to announce HTTP URLs, or network addresses, for downloading segments of data content. The MPD 200 may comprise a plurality of URLs, and/or metadata, to be used by a DASH client to construct a plurality of URLs, pointing to one or more HTTP servers for downloading segments of data. An asset disclosed herein may comprise the MPD and the media presentation. In the context of DASH, an asset may refer to content including media and metadata together with the rights to use the content by the content provider.

The MPD 200 may comprise various elements and/or attributes including, for example, Period 210, Adaptation Set 220, Representation 230, and Sub-Representation 250. The MPD 200 may contain references to Segments 240, and Segment 240 may contain information that describes Sub-Segment 260. The Period 210 may be associated with a period of data content. In accordance with ISO/IEC 23009-

1, the Period 210 may represent a media content period during which a consistent set of encoded versions of the media content is available. In other words, the set of available bit-rates, languages, captions, subtitles, etc., does not change during a period. An Adaptation Set 220 may comprise a set of mutually interchangeable Representations 230. A Representation 230 may describe a deliverable encoded version of one or several media content components. The DASH client may switch from representation to representation in order to adapt to network conditions or other factors. The DASH client may determine if it can support a specific Representation 230. If not, then the DASH client may select a different Representation 230 that it can support. A Segment 240 may be referred to as a unit of data associated with a URL. In other words, a Segment 240 may generally be the largest unit of data that can be retrieved with a single HTTP request using a single URL. The DASH client may be configured to download each segment within the selected Representation 230 until the DASH client ceases downloading or until the DASH client selects another Representation 230. Additional details for the Segment 240, the Sub-Representation 250, and the Sub-Segment 260 elements are described in ISO/IEC 23009-1.

The Period 210, Adaptation Set 220, Representation 230, and Sub-Representation 250 may describe data referring to Segment 240 and Sub-Segment 260. In an MPD, elements and attributes may be similar to those defined in XML. Elements may be distinguished from attributes by uppercase first letters or camel-casing, as well as bold face, though bold face is removed herein. Each element may comprise one or more attributes, which may be properties that further define the element. Attributes may be distinguished by a preceding @ symbol. For example, the Period 210 may comprise an @start attribute that may specify when on a presentation timeline a period associated with the Period 210 begins.

When streaming an asset comprising main media content (e.g., a movie or a sporting event), it is common to insert other contents such as advertisements (ads) or commercials into the main content. In case of DASH this would result in using multiple periods. Inserted periods may be placed between periods of the main media content. The inserted content may have any non-main content, that is, any content that is different from the main media content being played out. In case of ad insertion, each ad may occupy a single period, while the asset itself may be split into multiple periods. For example, an MPD for a video on demand (VoD) asset may comprise several 15-minute periods that belong to an asset, which are separated by one or more 3-minute ad breaks. One or more ads with the same or different contents may be played during an ad break.

Disclosed embodiments may apply to a use case where a streaming client (e.g., a media player) needs to show a progress bar and time. When a VoD asset is being presented, the player may need to present content timing regardless of ad timing. For example, the 70th minute of a total presentation may be the 59th minute of the asset if there are 11 minutes of ad time. The correct content timing should be 0:59:00 instead of 1:10:00. Same applies to a progress bar of the media player. For example, if there is an ad break between times 00:59:00 and 01:02:00, a better client behavior would be holding the progress bar until the ad break is over. Assuming that a period can either belong to an asset or to an inserted content, one solution to this problem is to expose whether the period belongs to the asset (e.g. a movie) or to the inserted content (e.g., an ad).

The use cases above can be resolved providing some type of asset identifier (ID) per period, e.g., by using information that identifies a main media content or an inserted content on the period level. For example, as shown in FIG. 2, an asset identifier 212 may be used to identify an asset (corresponding to the MPD 200) on a period level. Each Period 210 may comprise an asset identifier 212 to indicate that the period 210 belongs to the asset (i.e., not inserted content).

Figure 3:
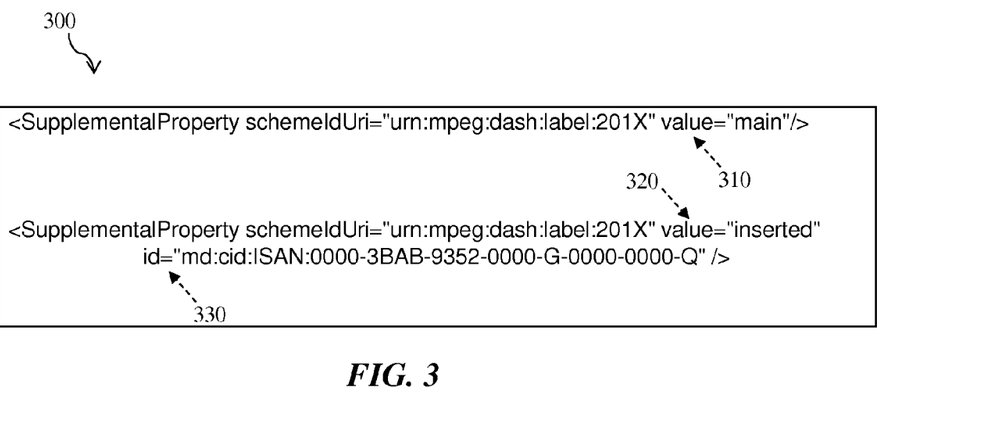
FIG. 3 illustrates an embodiment of a schema defined using DASH descriptors.

FIG. 3 illustrates an embodiment of a schema 300, which may be defined using DASH descriptors. As shown in FIG. 3, a scheme with an unique resource identifier (URI), e.g., "urn:mpeg:dash:label:201X", can be created using period-level supplemental property, with allowed @value being either "main" or "inserted". Note that the supplemental properties as shown in FIG. 3 serve as an example type of asset identifier, and that any other suitable type of asset identifier may be used if desired. The @value attribute 310 "main" corresponds to the asset, indicating that its corresponding period belongs to a main media content. The @value attribute 320 "inserted" corresponds to inserted content(s), which may be ad or other non-main media, indicating that its corresponding period does not belong to the main media content. Further, the @id attribute 330 can carry a uniform resource name (URN) uniquely identifying the inserted content.

It should be understood that specific URN, URI, ID, and other arbitrary information used in the present disclosure are for illustration purposes, thus such information can be changed within principles disclosed herein. Although FIG. 3 uses supplemental property (SupplementalProperty), as an exemplary generic descriptor on the period level, it should be understood that other types of descriptors such as a role descriptor can also be used for this purpose.

In existing MPDs, DASH descriptors (e.g. SupplementalProperty, Role, etc.) may be present at the adaptation set (denotable as AdaptationSet) and representation level, but not at the period level. Thus, when a period comprises more than one adaptation set, the descriptor has to be repeated with each adaptation set. A partial relief can be provided by restricting labeling to adaptation sets with role value of "main"; however there can be multiple adaptation sets with the role value of "main", so each adaptation set still needs to be labeled.

Disclosed embodiments avoid repeating the same descriptor across all adaptation sets in a period, e.g., by adding descriptors at the period level. In an embodiment for DASH, asset identifier (AssetIdentifier), which may be an element of the same DescriptorType as SupplementalProperty, is used to identify the asset on Period level. Any suitable type of asset identifier can be used to indicate that a certain period belongs to the asset. If two different Periods contain equivalent Asset Identifiers then the content in the two Periods belong to the same asset. If the scheme or the value for this descriptor is not recognized the AssetIdentifier element may still be used to understand the equivalence of Asset Identifiers across Periods. Processing of the descriptor scheme and value by the DASH client may not be essential for normal operation.

Figure 4:
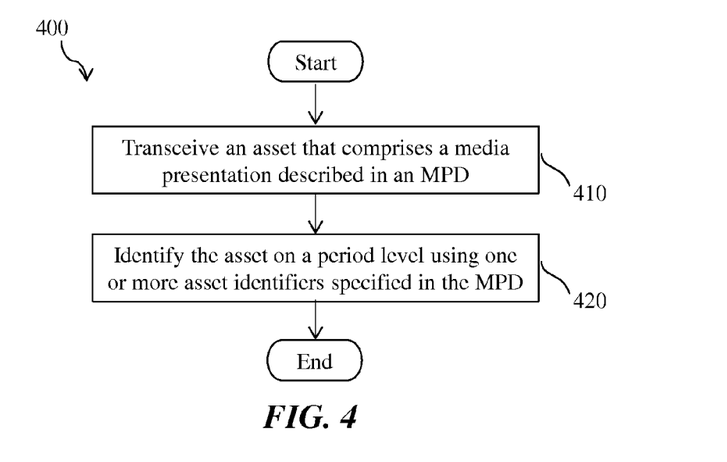
FIG. 4 is a flowchart of an embodiment of a DASH method.

FIG. 4 illustrates an embodiment of a DASH method 400, which may be implemented on a streaming server side or client side. In step 410, the method 400 may transceive an asset that comprises a media presentation described in an MPD. The term "transceive" herein includes receive, transmit, or both (either at the same time or at different times). The media presentation comprises one or more periods, with each period comprising at least one adaptation set. In step 420, the method 400 may identify the asset on a period level using one or more asset identifiers specified in the MPD. In an embodiment, suppose the media presentation comprises at least two different periods, the step 420 comprises substeps including: (a) determining that the two different periods contain equivalent asset identifiers, and (b) determining that contents in the two different periods belong to the asset based upon the two different periods containing the equivalent asset identifiers.

Further, when at least one of the periods comprises multiple adaptation sets, identifying the asset on the period level uses no more than one asset identifier for each period that comprises multiple adaptation sets. Thus, the potential issue of repeated labeling for multiple adaptation sets is avoided. In practice, an MPD may comprise label information for each period (e.g., asset identifier) that belongs to the main media content. If desired, the MPD may further comprise label information for each inserted content (e.g., ad identifier) that does not belong to the main media content.

According to an embodiment, an element or attribute denotable as Period.AssetIdentifier may be added to the DASH standard. For example, a period element in an MPD may comprise an AssetIdentifier to specify that this Period belongs to a certain asset. In the context of an apparatus for DASH, such as an HTTP server or a DASH client, the apparatus may comprise a transceiver (receiver and/or transmitter) configured to transceive an MPD for an asset. The asset may comprise a media presentation that is described in the MPD, wherein the media presentation comprises a period that is defined by a period element in the MPD. The period element may comprise an asset identifier specifying that the period belongs to the asset. The apparatus may further comprise a memory device coupled to the transceiver and configured to store the MPD.

The goal of period-level labeling may be reached by a new special-purpose descriptor, but it is possible that there will be other use cases when specifying a period-level informational property will be needed. Period-level labeling can be done by creating a new separate schema and using elements from this schema directly in the MPD.

Figure 5:
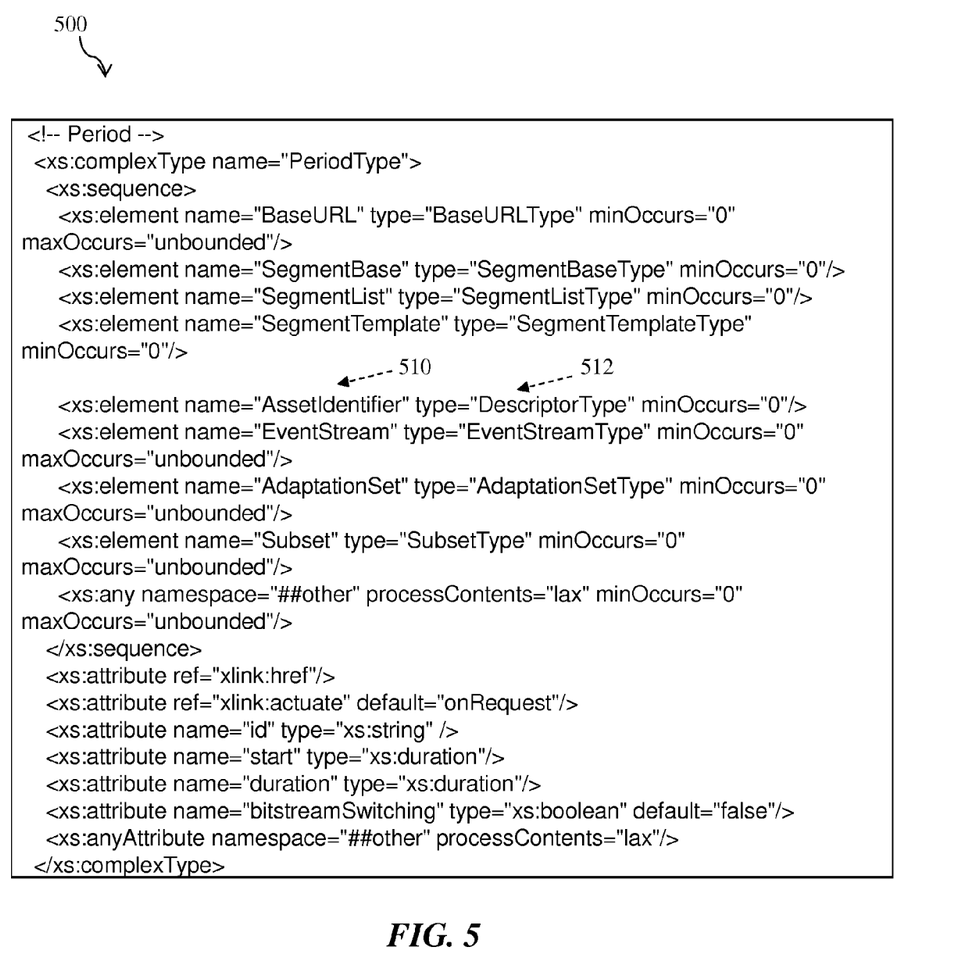
FIG. 5 illustrates an embodiment of a period element, which may be part of an MPD or a schema of the MPD according to DASH standards.

FIG. 5 illustrates an embodiment of a period element 500, which may be part of an MPD or a schema of the MPD according to DASH standards. The period element 500 follows XML syntax. An asset identifier 510, denotable as AssetIdentifier, is an element within the period element 500. Syntactically, the AssetIdentifier element 510 has a descriptor type (DescriptorType). As shown in FIG. 5, an element of a DASH descriptor type 512 is added to the period level. In other words, the AssetIdentifier element 510 has the DescriptorType 512. In practice, one or more elements of DescriptorType may be added on the period level. One of ordinary skill in the art will understand other elements and attributes presented in FIG. 5, thus they are not explained in detail for conciseness.

Disclosed embodiments may apply to another use case of reporting, where a streaming client (e.g., an application) may want to report which ad is being played out. Although logging and reporting can be done at the CDN side, reporting at the client side has its own merits. For example, having an application periodically upload a list of ads that were played together with some user-specific information may be simpler and require less resources than running CDN-side reporting across multiple CDN nodes.

Figure 6:
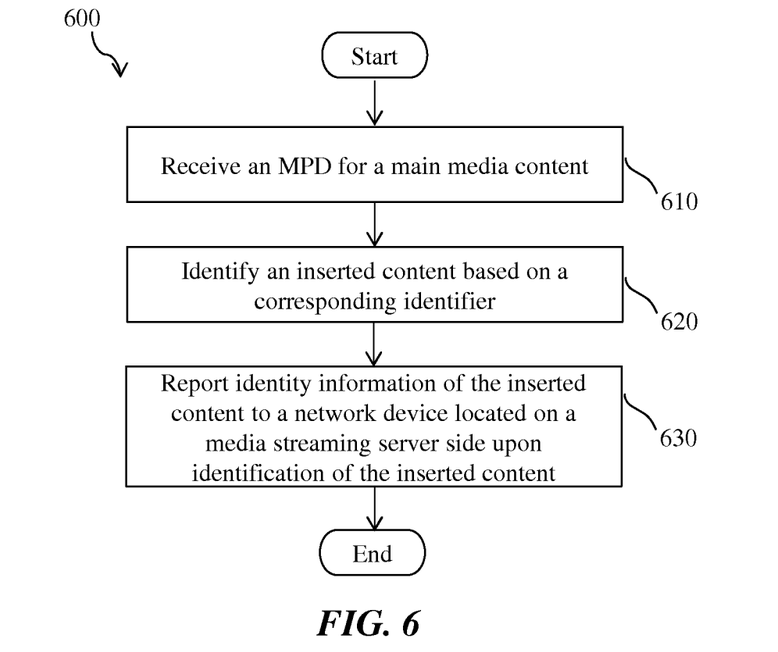
FIG. 6 is a flowchart of an embodiment of a media streaming method, which may be implemented by a streaming client.

FIG. 6 illustrates an embodiment of a media streaming method 600, which may be implemented by a streaming client. In step 610, the method 600 may receive an MPD for a main media content. The main media content may comprise a plurality of periods, at least some of which are separated by one or more inserted contents. The MPD may comprise a unique ID for each of the inserted contents. In an embodiment, the ID for the inserted content comprises a URN specific to the inserted content. The MPD comprises a period-level descriptor comprising an ID attribute, and the URN is specified in the ID attribute.

In step 620, the method 600 may identify an inserted content based on a corresponding identifier. In step 630, the method 600 may, upon identification of the inserted content, report identity information of the inserted content to a network node located on a media streaming server side.

It should be understood that FIG. 6 is for illustration purposes only, thus its steps can be modified and additional steps may be added whenever necessary. For example, suppose the plurality of periods in a media presentation comprises a first period with a first label and a second period with a second label, wherein the first period precedes the inserted content and the second period trails the inserted content. The method 600 may further play the second period of the main media content, and determine a timeline of the main media content in the second period without accounting a time duration of the inserted content. For instance, if the first period is 5 minutes long, the inserted content is 3 minutes long, and the playing is 2 minutes into the second period, then the correct timeline of the main media content should be 7 minutes instead of 10 minutes. Further, the method 600 may play the inserted content between the first period and the second period, and hold a progress bar (e.g., at 5 minutes) of the main media content when playing the inserted content.

Figure 7:
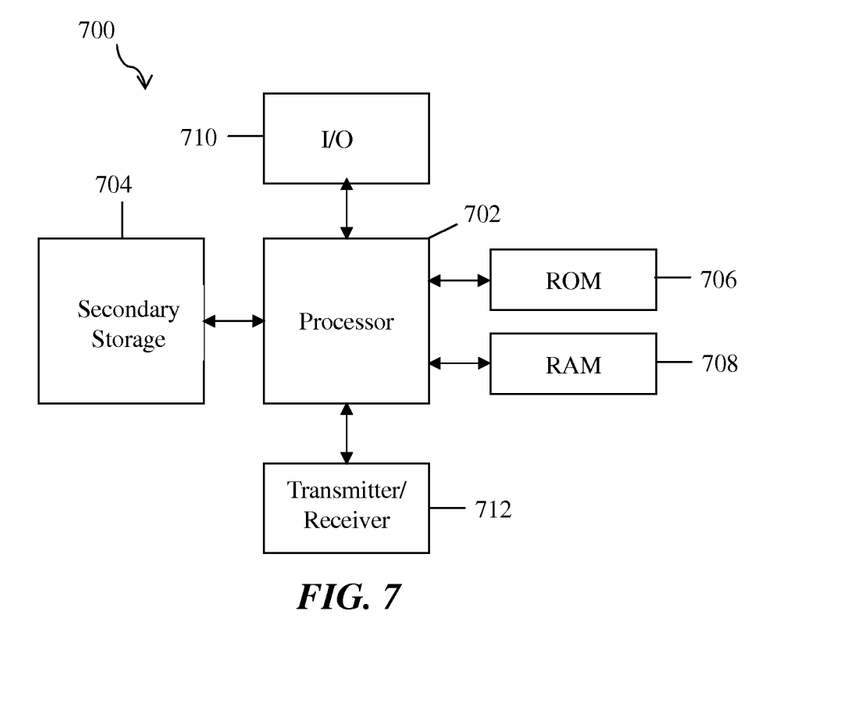
FIG. 7 is a schematic diagram of an embodiment of a network node.

The schemes described above may be implemented on a network component or node, such as a network node with sufficient processing power, memory resources, and network throughput capability to handle the necessary workload placed upon it. FIG. 7 illustrates an embodiment of a computer system or a network node 700 suitable for implementing one or more embodiments of the methods/schemes disclosed herein, such as the method 400 and the method 600. Further, the network node 700 may be configured to implement at least part of any of the apparatuses and systems described herein, such as the streaming client 110, the HTTP server 120, and the HTTP cache 150.

The network node 700 includes a processor 702 that is in communication with memory devices including secondary storage 704, read only memory (ROM) 706, random access memory (RAM) 708, input/output (I/O) devices 710, and transceiver (denoted as transmitter/receiver) 712. Although illustrated as a single processor, the processor 702 is not so limited and may comprise multiple processors. The processor 702 may be implemented as one or more central processor unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 702 may be configured to implement any of the schemes or methods described herein, including the method 400 and the method 600. The processor 702 may be implemented using hardware or a combination of hardware and software.

The secondary storage 704 is typically comprised of one or more disk drives or tape drives and is used for non-volatile storage of data and as an over-flow data storage device if the RAM 708 is not large enough to hold all working data. The secondary storage 704 may be used to store programs that are loaded into the RAM 708 when such programs are selected for execution. The ROM 706 is used to store instructions and perhaps data that are read during program execution. The ROM 706 is a non-volatile memory device that typically has a small memory capacity relative to the larger memory capacity of the secondary storage 704. The RAM 708 is used to store volatile data and perhaps to store instructions. Access to both the ROM 706 and the RAM 708 is typically faster than to the secondary storage 704.

The transmitter/receiver 712 may serve as an output and/or input (I/O) device of the network node 700. For example, if the transmitter/receiver 712 is acting as a transmitter, it may transmit data out of the network node 700. If the transmitter/receiver 712 is acting as a receiver, it may receive data into the network node 700. The transmitter/receiver 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 712 may enable the processor 702 to communicate with an Internet or one or more intranets. I/O devices 710 may include a video monitor, liquid crystal display (LCD), touch screen display, or other type of video display for displaying video, and may also include a video recording device for capturing video. I/O devices 710 may also include one or more keyboards, mice, or track balls, or other well-known input devices.

It is understood that by programming and/or loading executable instructions onto the network node 700, at least one of the processor 702, the secondary storage 704, the RAM 708, and the ROM 706 are changed, transforming the network node 700 in part into a particular machine or apparatus (e.g., an HTTP server or a DASH client having the novel functionality taught by the present disclosure). The executable instructions may be stored on the secondary storage 704, the ROM 706, and/or the RAM 708 and loaded into the processor 702 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

It should be understood that any processing of the present disclosure may be implemented by causing a processor (e.g., a general purpose CPU inside a computer system) in a computer system (e.g., the HTTP server 120) to execute a computer program. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc ROM (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of Dynamic Adaptive Streaming over Hypertext Transfer Protocol (HTTP) (DASH) comprising:
    receiving an asset that comprises a media presentation described in a media presentation description (MPD), wherein the media presentation comprises a plurality of periods, and wherein each period comprises at least one adaptation set;
    identifying the asset on a period level using one or more asset identifiers specified in the MPD, wherein at least some of the periods are separated by one or more inserted contents, and wherein the MPD comprises an identifier unique for each of the inserted contents;
    identifying an inserted content based on a corresponding identifier; and
    reporting identity information of the inserted content to a network device located on a media streaming server side upon identification of the inserted content.

2. The method of claim 1, wherein the media presentation comprises at least two different periods, and wherein identifying the asset on the period level comprises:
    determining that the two different periods contain equivalent asset identifiers; and
    determining that contents in the two different periods belong to the asset based upon the two different periods containing the equivalent asset identifiers.

3. The method of claim 1, wherein a schema of the MPD comprises a period element, wherein the asset identifier (AssetIdentifier), is an element within the period element, and wherein the AssetIdentifier element has a descriptor type (DescriptorType).

4. The method of claim 1, wherein a schema of the MPD comprises a period element, and wherein the schema of the MPD comprises one or more elements of descriptor type (DescriptorType) within the period element.

5. The method of claim 1, wherein a schema of the MPD comprises one or more supplemental properties (SupplementalProperty) on the period level, and wherein each SupplementalProperty corresponds to one of the periods.

6. The method of claim 1, wherein at least one of the periods comprises multiple adaptation sets, wherein each of the adaptation sets comprises one or more representations, and wherein identifying the asset on the period level uses no more than one asset identifier for each period that comprises multiple adaptation sets.

7. The method of claim 1, wherein the identifier for the inserted content comprises a uniform resource name (URN) specific to the inserted content, wherein the MPD comprises a DASH descriptor comprising an identifier attribute, and wherein the URN is specified in the identifier attribute.

8. An apparatus for Dynamic Adaptive Streaming over Hypertext Transfer Protocol (HTTP) (DASH), the apparatus comprising:
    a transceiver configured to transceive a media presentation description (MPD) for an asset, wherein the asset comprises a media presentation that is described in the MPD, wherein the media presentation comprises a plurality of periods that are each defined by a period element in the MPD, wherein each of the period elements comprises an asset identifier specifying that the period belongs to a main media content of the asset;
    a memory device coupled to the transceiver and configured to store the MPD, wherein the MPD further comprises label information for each of the periods; and
    determine that each period belongs to the main media content based on corresponding labeling information for each period.

9. The apparatus of claim 8, wherein each of the period elements follows extensible markup language (XML) syntax, and wherein each of the period elements comprises one or more elements of descriptor type (DescriptorType) on a period level.

10. The apparatus of claim 8, wherein the asset identifier (AssetIdentifier) is an element within the period element, and wherein the AssetIdentifier element has a descriptor type (DescriptorType).

11. The apparatus of claim 8, wherein the period comprises a plurality of adaptation sets, wherein each of the adaptation sets comprises one or more representations, and wherein only one asset identifier is contained in the period element corresponding to the plurality of adaptation sets.

12. The apparatus of claim 8, further comprising one or more processors coupled to the transceiver and configured to add the asset identifier in each of the period elements, wherein transceiving the asset comprises transmitting the MPD to a DASH client after addition of the asset identifier.

13. A computer program product comprising computer executable instructions stored on a non-transitory computer readable medium such that when executed by a processor cause a network node to:
    receive a media presentation description (MPD) for a main media content, wherein the main media content comprises a plurality of periods, wherein at least some of the periods are separated by one or more inserted contents, wherein the MPD comprises an identifier unique for each of the inserted contents;
    identify an inserted content based on a corresponding identifier; and
    report identity information of the inserted content to a network device located on a media streaming server side upon identification of the inserted content.

14. The computer program product of claim 13, wherein the identifier for the inserted content comprises a uniform resource name (URN) specific to the inserted content, wherein the MPD comprises a period-level descriptor comprising an identifier attribute, and wherein the URN is specified in the identifier attribute.

15. The computer program product of claim 14, wherein the period-level descriptor is a Dynamic Adaptive Streaming over Hypertext Transfer Protocol (HTTP) (DASH) descriptor, wherein the identified inserted content is an advertisement, and wherein the identity information of the advertisement reported to the network device is different from identity information of other advertisements inserted into the main media content.

16. The computer program product of claim 15, wherein the MPD follows extensible markup language (XML) syntax, and wherein the DASH descriptor is a supplemental property in the MPD.

17. The computer program product of claim 13, wherein the MPD further comprises label information for each inserted content, and wherein the computer program product further comprises instructions that cause the network node to determine that the inserted contents do not belong to the main media content based on corresponding labeling information for each inserted content.

18. The computer program product of claim 13, wherein the MPD further comprises label information for each of the periods, and wherein the computer program product further comprises instructions that cause the network node to determine that each period belongs to the main media content based on corresponding labeling information for each period.

19. The computer program product of claim 18, wherein at least one of the periods comprises multiple adaptation sets, wherein each of the adaptation sets comprises one or more representations, wherein the label information is implemented as a descriptor for each period, and wherein no more than one descriptor is used per period to specify that the period belongs to the main media content.

20. The computer program product of claim 18, wherein the periods comprises a first period with a first label and a second period with a second label, wherein the first period precedes the inserted content and the second period trails the inserted content, and wherein the computer program product further comprises instructions that cause the network node to:
play the second period of the main media content; and
determine a timeline of the main media content in the second period,
wherein the timeline of the main media content does not account a time duration of the inserted content.

21. The computer program product of claim 20, further comprising instructions that cause the network node to:
play the inserted content between the first period and the second period; and
hold a progress bar of the main media content when playing the inserted content.

* * * * *